US012105383B2

(12) United States Patent
Song et al.

(10) Patent No.: US 12,105,383 B2
(45) Date of Patent: Oct. 1, 2024

(54) ARRAY SUBSTRATE HAVING CONDUCTIVE BUMPS, LIQUID CRYSTAL DISPLAY PANEL AND METHOD FOR MANUFACTURING THE SAME, AND DISPLAY APPARATUS

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yanyong Song, Beijing (CN); Yanfeng Li, Beijing (CN); Haoyi Xin, Beijing (CN); Xu Qiao, Beijing (CN); Chenrong Qiao, Beijing (CN); Wei Ren, Beijing (CN); Yu Xing, Beijing (CN); Jingjing Xu, Beijing (CN); Rula Sha, Beijing (CN); Guolei Zhi, Beijing (CN); Guangshuai Wang, Beijing (CN); Liwen Xin, Beijing (CN); Jingwei Hou, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 17/770,280

(22) PCT Filed: Apr. 14, 2021

(86) PCT No.: PCT/CN2021/087174
§ 371 (c)(1),
(2) Date: Apr. 19, 2022

(87) PCT Pub. No.: WO2021/227753
PCT Pub. Date: Nov. 18, 2021

(65) Prior Publication Data
US 2022/0291538 A1 Sep. 15, 2022

(51) Int. Cl.
*G02F 1/1339* (2006.01)
*G02F 1/1333* (2006.01)
(Continued)

(52) U.S. Cl.
CPC .... *G02F 1/13394* (2013.01); *G02F 1/133351* (2013.01); *G02F 1/133514* (2013.01);
(Continued)

(58) Field of Classification Search
CPC .................. G02F 1/13458; G02F 1/134309
See application file for complete search history.

(56) References Cited

U.S. PATENT DOCUMENTS

2007/0296905 A1 12/2007 Yamanaka
2010/0289997 A1* 11/2010 Suzuki .............. H01L 29/41733
349/158
(Continued)

FOREIGN PATENT DOCUMENTS

CN 207352324 U 5/2018
CN 108231692 A 6/2018
(Continued)

*Primary Examiner* — Lauren Nguyen
(74) *Attorney, Agent, or Firm* — IP & T GROUP LLP

(57) ABSTRACT

An array substrate has a display area and a bezel area located on at least one side of the display area. The bezel area includes a bonding region. The array substrate includes a substrate, a plurality of signal lines, a plurality of conductive bumps, and an insulating layer. The signal lines are disposed on the substrate. The conductive blocks are disposed on a portion of the substrate located in the bonding region, and a conductive bump is connected to at least one signal line. The insulating layer covers the plurality of signal lines and is located between every two adjacent conductive bumps. The conductive bump includes a conductive metal layer. A distance from a surface of the conductive metal layer away from the substrate to the substrate is less than or equal to a (Continued)

distance from a surface of the insulating layer away from the substrate to the substrate.

15 Claims, 4 Drawing Sheets

(51) Int. Cl.
   *G02F 1/1335*     (2006.01)
   *G02F 1/1343*     (2006.01)
   *G02F 1/1345*     (2006.01)
   *G02F 1/1362*     (2006.01)
   *G02F 1/1368*     (2006.01)
   *G02F 1/16756*    (2019.01)

(52) U.S. Cl.
   CPC .... *G02F 1/13396* (2021.01); *G02F 1/134309* (2013.01); *G02F 1/13458* (2013.01); *G02F 1/136227* (2013.01); *G02F 1/136286* (2013.01); *G02F 1/1368* (2013.01); *G02F 1/16756* (2019.01); *G02F 1/13439* (2013.01)

(56) References Cited

U.S. PATENT DOCUMENTS

| | | | |
|---|---|---|---|
| 2013/0320346 A1* | 12/2013 | Woo | H01L 27/124 438/34 |
| 2015/0049449 A1 | 2/2015 | Shibano et al. | |
| 2015/0200137 A1* | 7/2015 | Orozco-Teran | H01L 23/53266 257/288 |
| 2016/0211279 A1* | 7/2016 | Her | G02F 1/13458 |
| 2019/0121185 A1* | 4/2019 | Liu | G02F 1/133351 |
| 2021/0351353 A1 | 11/2021 | Lu et al. | |
| 2022/0077200 A1 | 3/2022 | Yang | |
| 2022/0291538 A1 | 9/2022 | Song et al. | |

FOREIGN PATENT DOCUMENTS

| | | | | |
|---|---|---|---|---|
| CN | 10-8288437 | * | 7/2018 | .............. G09F 9/30 |
| CN | 109523912 A | | 3/2019 | |
| CN | 110459505 A | | 11/2019 | |
| CN | 110676217 A | | 1/2020 | |
| CN | 212135113 U | | 12/2020 | |
| TW | 200801676 A | | 1/2008 | |

* cited by examiner

ARRAY SUBSTRATE HAVING CONDUCTIVE BUMPS, LIQUID CRYSTAL DISPLAY PANEL AND METHOD FOR MANUFACTURING THE SAME, AND DISPLAY APPARATUS

CROSS-REFERENCE TO RELATED APPLICATIONS

The present disclosure is a national phase entry under 35 USC 371 of International Patent Application No. PCT/CN2021/087174 filed on Apr. 14, 2021, which claims priority to Chinese Patent Application No. 202020822092.2, filed on May 15, 2020, which are incorporated herein by reference in their entirety.

TECHNICAL FIELD

The present disclosure relates to the field of display technologies, and in particular, to an array substrate, a liquid crystal display panel and a method for manufacturing the same, and a display apparatus.

BACKGROUND

With the development of full-screen technology, a screen-to-body ratio of a display apparatus is constantly improved, resulting in an increasingly narrow bezel area of a liquid crystal display panel in the display apparatus.

Currently, a main structure of the liquid crystal display panel includes an array substrate, an opposite substrate, and a liquid crystal layer disposed between the array substrate and the opposite substrate. A bonding region of the array substrate is located in the bezel area. A plurality of conductive bumps are provided on a portion of the array substrate located in the bonding region, so that each conductive bump is connected to a corresponding signal line in the array substrate, which is beneficial to realize the chip on film (COF) encapsulation through each conductive bump. As a result, that the circuit(s) are bonded to the liquid crystal display panel in the case of a narrow bezel is realized.

SUMMARY

In an aspect, the embodiments of the present disclosure provide an array substrate. The array substrate has a display area and a bezel area located on at least one side of the display area. The bezel area includes a bonding region. The array substrate includes a substrate, a plurality of signal lines, a plurality of conductive bumps, and an insulating layer. The signal lines are disposed on the substrate. The conductive bumps are disposed on a portion of the substrate located in the bonding region, and a conductive bump is connected to at least one signal line. The insulating layer covers the plurality of signal lines and is located between every two adjacent conductive bumps. The conductive block includes a conductive metal layer. A distance from a surface of the conductive metal layer away from the substrate to the substrate is less than or equal to a distance from a surface of the insulating layer away from the substrate to the substrate.

In some embodiments, the distance from the surface of the conductive metal layer away from the substrate to the substrate is substantially equal to the distance from the surface of the insulating layer away from the substrate to the substrate. The conductive bump further includes an electrode layer disposed on the surface of the conductive metal layer away from the substrate. A surface of the electrode layer away from the substrate is parallel to a plane where the substrate is located.

In some embodiments, an orthogonal projection of the conductive metal layer on the substrate is located within an orthogonal projection of a signal line connected to the conductive metal layer on the substrate.

In some embodiments, the plurality of conductive bumps are arranged side by side in a first direction, and an extending direction of the conductive bump intersects an extending direction of a boundary of a side of the substrate where the conductive bumps are arranged. The first direction is parallel to the extending direction of the boundary.

In some embodiments, the plurality of conductive bumps include first conductive bumps and second conductive bumps that extend in different directions.

In some embodiments, the conductive bumps are strip-shaped.

In some embodiments, a space between every two adjacent conductive bumps is substantially equal.

In some embodiments, the array substrate further includes a plurality of thin film transistors disposed on the substrate. A thin film transistor includes a gate, a source, and a drain. The gate and the signal lines are disposed in a same layer. The insulating layer located on a side of the gate away from the substrate. The source and the drain are located on a side of the insulating layer away from the substrate. The conductive metal layer is disposed in a same layer as the source and the drain.

In some embodiments, the array substrate further includes a plurality of pixel electrodes disposed on a side of the drain away from the substrate. A pixel electrode is connected to the drain of the thin film transistors.

The conductive bump further includes an electrode layer, the electrode layer is disposed in a same layer as the pixel electrodes.

In another aspect, the embodiments of the present disclosure provide a liquid crystal display panel motherboard. The liquid crystal display panel motherboard includes the array substrate, an opposite substrate, a liquid crystal layer. The array substrate is as described in some of the above embodiments. The liquid crystal layer is disposed between the array substrate and the opposite substrate. A portion of the opposite substrate opposite to the bonding region is provided with a plurality of supporting spacers. An orthogonal projection of a supporting spacer on the substrate is located outside an orthogonal projection of the conductive bump on the substrate.

In some embodiments, every two adjacent conductive bumps have a space therebetween. Orthogonal projections of the plurality of supporting spacers on the substrate are uniformly distributed within orthogonal projections of a plurality of spaces on the substrate.

In some embodiments, the plurality of supporting spacers include a plurality of primary supporting spacers and a plurality of auxiliary supporting spacers. The plurality of primary supporting spacers and the plurality of auxiliary supporting spacers are uniformly distributed in the bonding region.

In some embodiments, the opposite substrate includes a color filter substrate. The plurality of supporting spacers are disposed on a surface of the color filter substrate proximate to the array substrate.

In yet another aspect, the embodiments of the present disclosure provide a liquid crystal display panel motherboard. The liquid crystal display panel motherboard includes the array substrate and an opposite substrate. The array substrate is as described in some of the above embodiments. A portion of the opposite substrate opposite to the bonding region is provided with a plurality of supporting spacers, and a supporting spacer is in contact with the conductive bump.

In yet another aspect, the embodiments of the present disclosure provide a display apparatus. The display apparatus includes a liquid crystal display panel, a flexible circuit board, and a backlight module. The liquid crystal display panel is located on a light exit side of the backlight module. The flexible circuit board is bonded to the plurality of conductive bumps in the array substrate. The array substrate is as described in some of the above embodiments.

In yet another aspect, the embodiments of the present disclosure provide a method for manufacturing a liquid crystal display panel. The method including: providing the array substrate, the array substrate being as described in some of the above embodiments; providing an opposite substrate including providing a plurality of supporting spacers in a portion of the opposite substrate opposite to the bonding region; assembling the array substrate with the opposite substrate to form a cell, so as to obtain a liquid crystal display panel motherboard; cutting the liquid crystal display panel motherboard; and removing the plurality of supporting spacers to obtain the liquid crystal display panel.

In some embodiments, an orthogonal projection of a supporting spacer on the substrate is located outside an orthogonal projection of the conductive bump on the substrate.

In some embodiments, a supporting spacer is in contact with the conductive bump.

BRIEF DESCRIPTION OF THE DRAWINGS

In order to describe technical solutions in some embodiments of the present disclosure more clearly, accompanying drawings to be used in the description of some embodiments will be introduced briefly below. Obviously, the accompanying drawings to be described below are merely some embodiments of the present disclosure, and a person of ordinary skill in the art may obtain other drawings according to these drawings.

DETAILED DESCRIPTION

Figure 1:
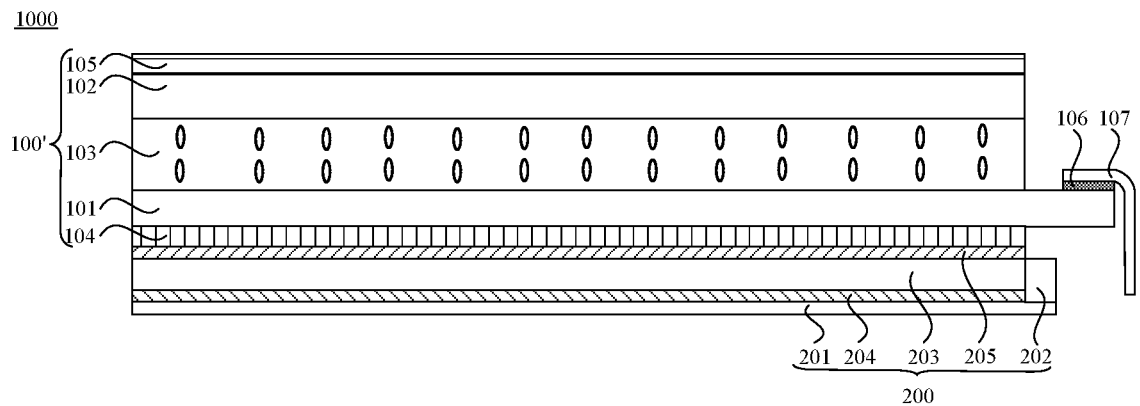
FIG. 1 is a schematic structural diagram of a display apparatus, in accordance with embodiments of the present disclosure.

Technical solutions in some embodiments of the present disclosure will be described clearly and completely below with reference to the accompanying drawings in some embodiments of the present disclosure. Obviously, the described embodiments are merely some but not all embodiments of the present disclosure. All other embodiments obtained on the basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials, or characteristics may be included in any one or more embodiments or examples in any suitable manner.

Below, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

Some embodiments may be described using the expression "coupled" and "connected" along with their derivatives. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

In addition, the use of the phrase "based on" is meant to be open and inclusive, since a process, step, calculation or other action that is "based on" one or more of the stated conditions or values may, in practice, be based on additional conditions or values exceeding those stated.

The term "substantially" or "approximately" as used herein includes a stated value and an average value within an acceptable range of deviation of a particular value. The acceptable range of deviation is determined by a person of ordinary skill in the art in view of the measurement in question and errors associated with the measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Variations in shape with respect to the drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Embodiments of the present disclosure provide a display apparatus, such as a display, a television, a mobile phone, a tablet computer, a notebook computer, an electronic paper, a digital photo frame, a navigator, or other products or components having a display function and using liquid crystal display technology.

In some embodiments, as shown in FIG. 1, the display apparatus 1000 includes a liquid crystal display panel 100' and a backlight module 200. The liquid crystal display panel 100 is disposed on a light exit side of the backlight module 200, and the backlight module 200 can provide light for the liquid crystal display panel 100.

For example, referring to FIG. 1, the backlight module 200 includes a bottom frame 201, a light bar 202 and a light guide plate 203. The bottom frame 201 is used to accommodate elements such as the light bar 202 and the light guide plate 203, and a shape of the bottom frame 201 may be determined according to actual needs. For example, the bottom frame 201 includes a back plate and a side wall located at a periphery of the back plate.

The light bar 202 is located in the bottom frame 201, for example, the light bar 202 is disposed on an inner side of the side wall of the bottom frame 201. The light guide plate 203 is an edge-lit light guide plate. The light guide plate 203 is located on the back plate of the bottom frame 201 and on a light exit side of the light bar 202. A light incident surface of the light guide plate 203 is a side face of the light guide plate 203. A light exit surface of the light guide plate 203 is parallel to the back plate. An optical film such as a reflective sheet or a brightness enhancement film, and fins may be disposed between the light guide plate 203 and the back plate, for example, the reflective sheet 204 in FIG. 1. A surface of the light guide plate 203 away from the back plate may also be provided with an optical film such as a diffusion sheet or a brightness enhancement film, for example, the diffusion sheet 205 in FIG. 1, thereon.

In some embodiments, as shown in FIG. 1, the liquid crystal display panel 100' includes an array substrate 101, an opposite substrate 102, and a liquid crystal layer 103 disposed between the array substrate 101 and the opposite substrate 102. Optionally, the liquid crystal display panel 100' further includes a first polarizer 104 disposed on a side of the array substrate 101 away from the liquid crystal layer 103 and a second polarizer 105 disposed on a side of the opposite substrate 102 away from the liquid crystal layer 103.

Figure 2:
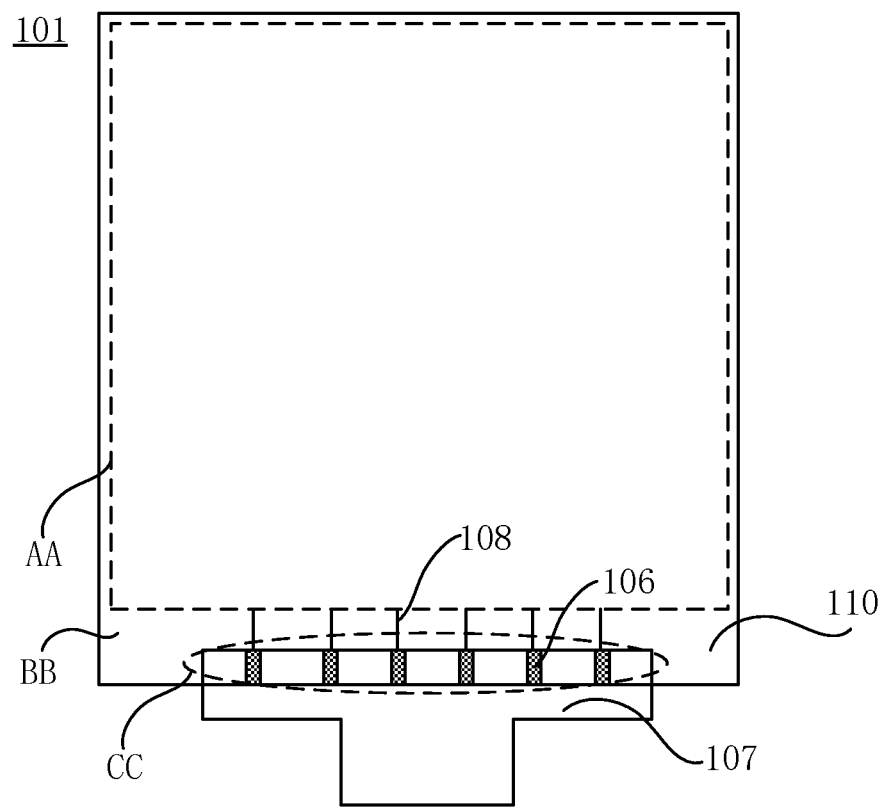
FIG. 2 is a schematic top view of an array substrate, in accordance with embodiments of the present disclosure.
Figure 3:
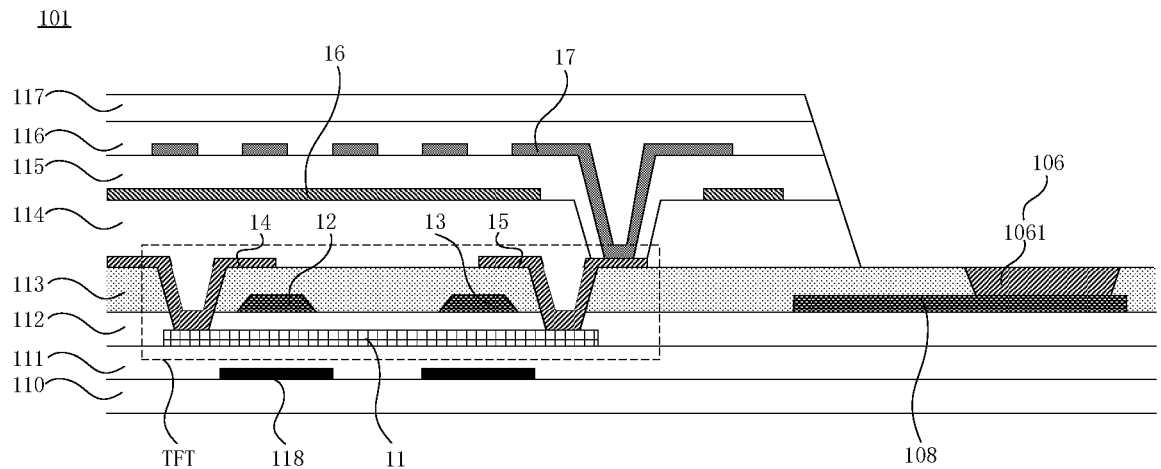
FIG. 3 is a partial sectional view of an array substrate, in accordance with embodiments of the present disclosure.

In some embodiments, referring to FIG. 2, in the liquid crystal display panel 100', the array substrate 101 has a display area AA and a bezel area BB located on at least one side of the display area AA. The bezel area BB includes a bonding region CC. Referring to FIG. 3, the array substrate 101 includes a substrate 110, and a plurality of sub-pixels arranged in an array on a portion of the substrate 110 located in the display area AA. Each sub-pixel includes a pixel driving circuit and a pixel electrode 17 disposed on the substrate 110. In some examples, the array substrate 101 further includes a peripheral circuit, such as a gate driving circuit, disposed on a portion of the substrate 110 located in the bezel area BB.

The pixel driving circuit includes at least one thin film transistor TFT. A type of the thin film transistor TFT may be determined according to actual needs, such as a P-type thin film transistor or an N-type thin film transistor; alternatively, for another example, the thin film transistor TFT may be a top-gate thin film transistor, a bottom-gate thin film transistor or a double-gate thin film transistor.

For example, the thin film transistor TFT adopts a double-gate structure. As shown in FIG. 3, the thin film transistor TFT includes an active layer 11, a gate insulating layer 112, a first gate 12, a second gate 13, an interlayer insulating layer 113, a source 14, and a drain 15. The source 14 and the drain 15 are located on a surface of the interlayer insulating layer 113 facing away from the substrate 110. The source 14 and the drain 15 are in contact with the active layer 11 passing through via holes in the interlayer insulating layer 113 and the gate insulating layer 112. The first gate 12 and the second gate 13 are insulated and are located on a surface of the gate insulating layer 112 facing away from the substrate 110. The pixel electrode 17 in each sub-pixel is connected to a drain 15 of a thin film transistor TFT of the pixel driving circuit in a same sub-pixel.

In some embodiments, as shown in FIG. 3, the array substrate 101 further includes a common electrode 16 disposed on the substrate 110.

For example, the pixel electrode 17 and the common electrode 16 are disposed in a same layer. In this case, the pixel electrode 17 and the common electrode 16 are each a comb electrode including a plurality of strip-shaped sub-electrodes.

For example, the pixel electrode 17 and the common electrode 16 may be disposed in different layers. In this case, as shown in FIG. 3, a first insulating layer 115 is provided between the pixel electrode 17 and the common electrode 16. In a case where the common electrode 16 is located between the thin film transistor TFT and the pixel electrode 17, as shown in FIG. 3, a second insulating layer 114 is further provided between the common electrode 16 and the thin film transistor TFT.

In addition, in some embodiments, referring to FIG. 3, the array substrate 101 further includes a first planarization layer 116 covering surfaces of the pixel driving circuits and the pixel electrodes 17, and a first alignment layer 117 disposed on a surface of the first planarization layer 116 away from the substrate 110. The array substrate 101 further includes light shielding patterns 118 disposed on the substrate 110, and a buffer layer 111 formed between the light shielding patterns 118 and the active layer 11. The light shielding pattern 118 is configured to block light incident on a channel region of the active layer 11.

Figure 4:
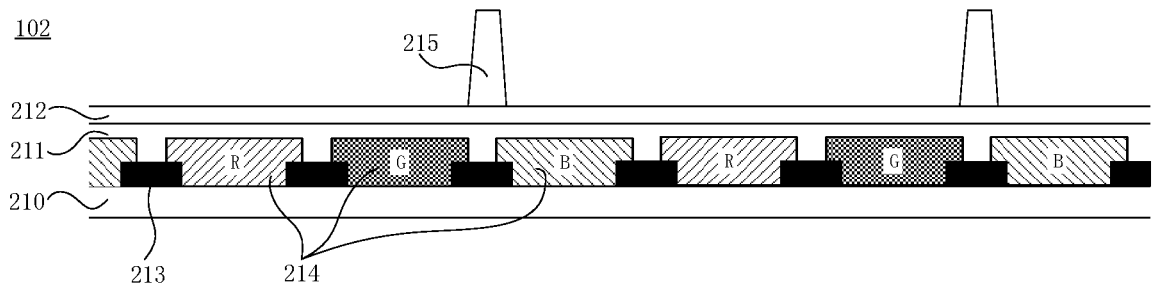
FIG. 4 is a partial sectional view of an opposite substrate, in accordance with embodiments of the present disclosure.

In some embodiments, as shown in FIG. 4, the opposite substrate 102 is a color filter (CF) substrate. The color filter substrate includes a substrate 210, and black matrix patterns 213 and color filter patterns 214 that are disposed on the substrate 210. The color filter patterns include at least three primary color photoresist units, such as red photoresist units R, green photoresist units G, and blue photoresist units B. The red photoresist units R, the green photoresist units G, and the blue photoresist units B are respectively in one-to-one correspondence with the sub-pixels on the array substrate. The black matrix patterns 213 can separate the red photoresist units R, the green photoresist units G, and the blue photoresist units B.

In addition, optionally, referring to FIG. 4, the opposite substrate 102 further includes a second planarization layer 211 covering surfaces of the black matrix patterns 213 and the color filter patterns 214, and a second alignment layer 212 disposed on a surface of the second planarization layer 211 away from the substrate 210. The opposite substrate 102 further includes a plurality of spacers 215 uniformly disposed on a surface of the second alignment layer 212 away from the substrate 210. The spacers 215 are located in the display area AA.

The liquid crystal display panel 100' is usually obtained through cutting using a laser cutting process. That is, after a motherboard of the opposite substrate 102 is assembled with a motherboard of the array substrate 101 to form a cell, cutting is performed along cutting lines, so that a plurality of liquid crystal display panels may be obtained.

In some embodiments, referring to FIG. 2, the array substrate 101 includes a plurality of signal lines 108 and a plurality of conductive bumps 106. The signal lines 108 are disposed on the substrate 110 and are configured to transmit signals to the pixel driving circuits or the peripheral circuit. The signal transmitted by each signal line 108 may be determined according to actual needs. For example, according to types of the signals transmitted by the signal lines 108, the signal line 108 is a power voltage signal line, a clock signal line, a data signal line, or a reset signal line.

The conductive bumps 106 are disposed on a portion of the substrate 110 located in the bonding region CC. Each conductive bump 106 is connected to at least one signal line 108. The conductive bump 106 is made of a conductive material, and the conductive material may be the same as a conductive material in the array substrate 101 configured to manufacture the first gate 12, the second gate 13, the source 14, the drain 15, or the pixel electrode 17.

Figure 5:
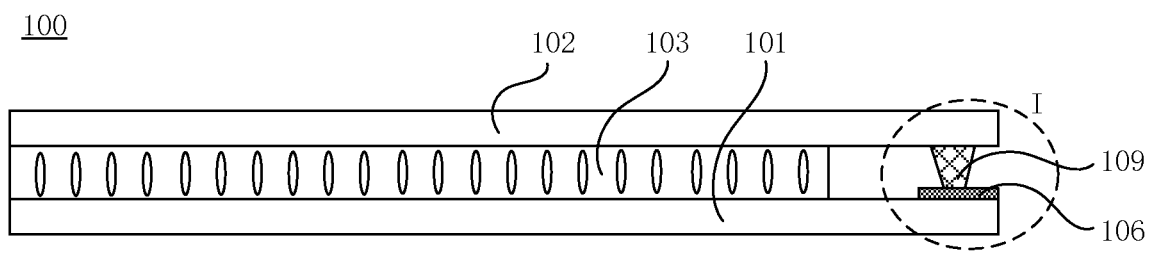
FIG. 5 is a schematic structural diagram of a liquid crystal display panel motherboard, in accordance with embodiments of the present disclosure.
Figure 6:
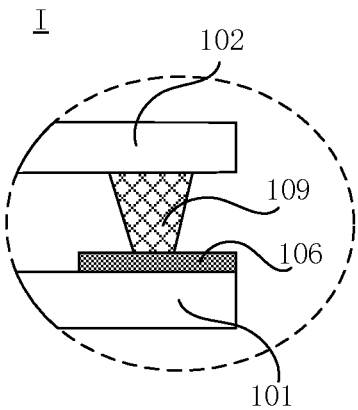
FIG. 6 is an enlarged schematic diagram of region I in FIG. 5.
Figure 7:
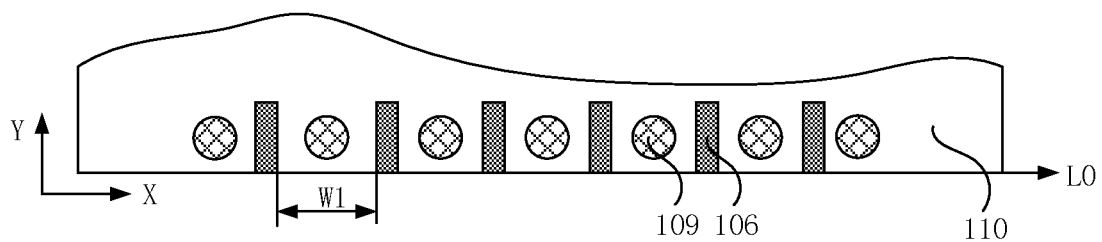
FIG. 7 is a schematic diagram showing distributions of conductive bumps and supporting spacers, in accordance with embodiments of the present disclosure.

Since a portion of the array substrate 101 located in the bonding region CC and a portion of the array substrate 101 located in the display area AA have different structures, in order to ensure a uniform cell gap of the liquid crystal display panel 100' after cutting, a portion of the opposite substrate 102 opposite to the bonding region CC is provided with a plurality of supporting spacers 109 therein, which are shown in FIGS. 5 and 6. Here, the supporting spacer 109 is in contact with the conductive bump 106 in the array substrate 101. In a subsequent process, the supporting spacer 109 needs to be cut and removed or thinned and polished to ensure that the conductive bump 106 is exposed. In this way, as shown in FIGS. 1 and 7, a bonding between a flexible printed board (FPC) 107 and the array substrate 101, by a chip on film (COF) technology, is achieved by using the conductive bumps 106 in the embodiments of the present disclosure, thereby achieving that circuit(s) are bonded to the liquid crystal display panel in the case of a narrow bezel.

Figure 9:
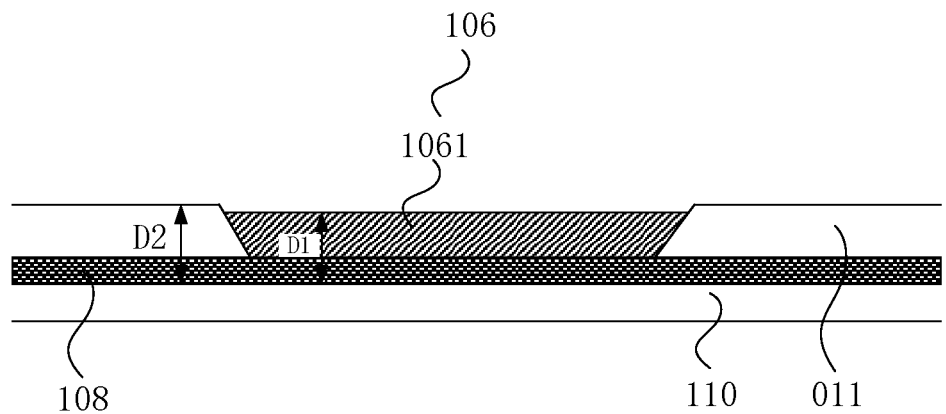
FIG. 9 is a schematic structural diagram of a conductive bump, in accordance with embodiments of the present disclosure.

It will be noted that two adjacent signal lines 108 are insulated, and two adjacent conductive bumps 106 are insulated. Referring to FIGS. 3 and 9, the array substrate 101 further includes an insulating layer 011 covering each signal line 108 and located between every two adjacent conductive bumps 106. In a case where the array substrate 101 adopts a structure as shown in FIG. 3, the insulating layer 011 is the interlayer insulating layer 113.

In some embodiments, referring to FIGS. 3 and 9, the conductive bump 106 includes a conductive metal layer 1061. The signal line 108 is disposed in a same layer as the first gate 12 and the second gate 13 of the thin film transistor TFT, for example, the signal line 108 and the first gate 12 and the second gate 13 of the thin film transistor TFT are manufactured using the same conductive material in a first patterning process. The conductive metal layer 1061 is disposed in a same layer as the source 14 and the drain 15 of the thin film transistor TFT, for example, the conductive metal layer 1061 and the source 14 and the drain 15 of the thin film transistor TFT are manufactured using the same conductive material in a second patterning process.

Referring to FIG. 9, a distance D1 from a surface of the conductive metal layer 1061 away from the substrate 110 to the substrate 110 is less than or equal to a distance D2 from a surface of the insulating layer 011 away from the substrate 110 to the substrate 110. That is, with reference to the substrate 110, the surface of the conductive metal layer 1061 away from the substrate 110 is not higher than the surface of the insulating layer 011 away from the substrate 110. For example, the distance D1 from the surface of the conductive metal layer 1061 away from the substrate 110 to the substrate 110 is equal to or substantially equal to the distance D2 from the surface of the insulating layer 011 away from the substrate 110 to the substrate 110.

In this way, a top face of the conductive metal layer 1061, i.e., a top face of the conductive bump 106, is not higher than the surface of the insulating layer 011 away from the substrate 110. After the motherboard of the opposite substrate 102 is assembled with the motherboard of the array substrate 101 to form the cell, each supporting spacer 109 disposed on the opposite substrate 102 is in contact with the insulating layer 011, so that the supporting spacer 109 is not in contact with the conductive bump 106 or is in contact with the conductive bump 106 in a planar manner. In this way, in a process of cutting or thinning and polishing a liquid crystal display panel motherboard, due to the extrusion of an external force, the supporting spacer 109 exerts a force on the insulating layer 011 or on the flat top face of the conductive bump 106, so that the conductive bump 106 may be prevented from being crushed, and thus a problem of short circuit between adjacent conductive bumps 106 due to the extrusion may be avoided, and poor conduction may be avoided in the finished liquid crystal display panel.

In addition, in the embodiments of the present disclosure, with reference to the substrate 110, the conductive bump 106 is not higher than the insulating layer 011. That is, the conductive bump 106 is flush with the insulating layer 011, or the conductive bump 106 is recessed into the insulating layer 011. Correspondingly, pins of the flexible circuit is board 107 or other driving chips adopt a protruding structure that matches the conductive bump 106, which facilitates a bonding operation between the flexible circuit board 107 or other driving chips and the conductive bump 106.

Figure 10:
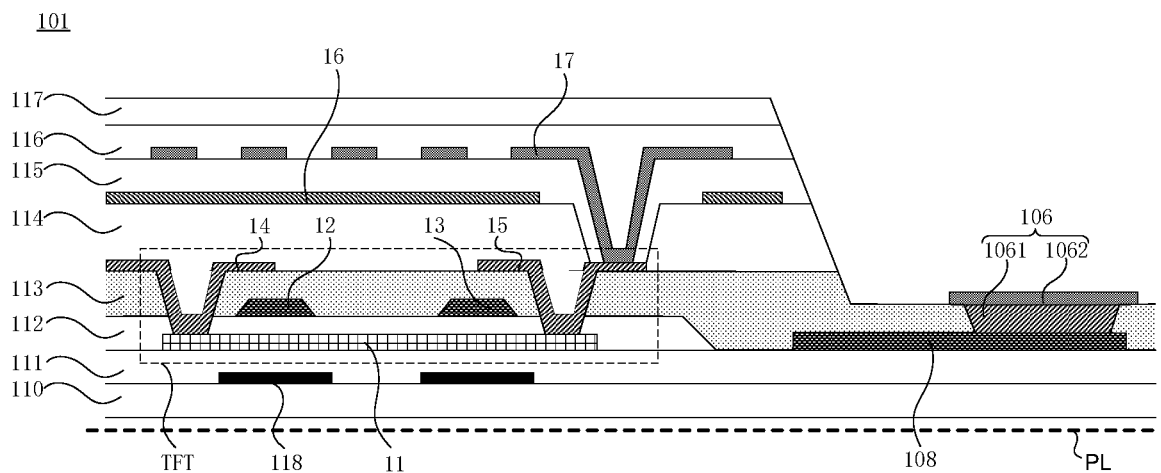
FIG. 10 is a partial sectional view of another array substrate, in accordance with embodiments of the present disclosure.
Figure 11:
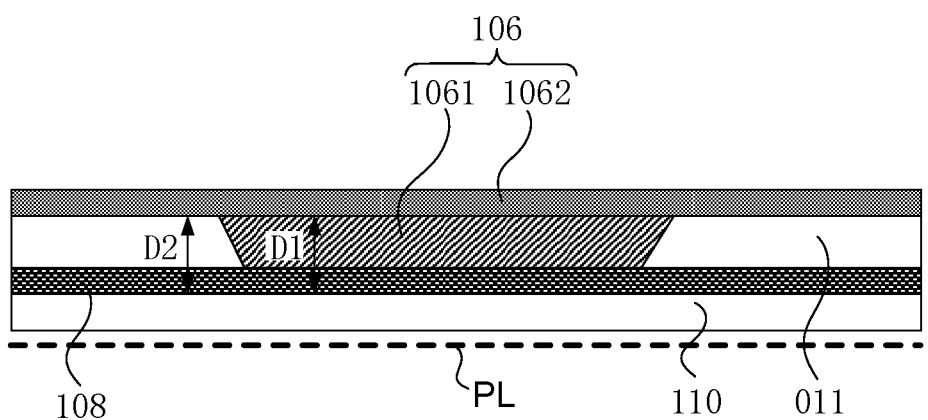
FIG. 11 is a schematic structural diagram of another conductive bump, in accordance with embodiments of the present disclosure.

In some other embodiments, referring to FIGS. 10 and 11, the conductive bump 106 includes a conductive metal layer 1061 and an electrode layer 1062 disposed on a surface of the conductive metal layer 1061 away from the substrate 110. The signal line 108 is disposed in a same layer as the first gate 12 and the second gate 13 of the thin film transistor TFT, for example, the signal line 108 and the first gate 12 and the second gate 13 of the thin film transistor TFT are manufactured using the same conductive material in a first patterning process. A distance D1 from a surface of the conductive metal layer 1061 away from the substrate 110 to the substrate 110 is equal to or substantially equal to a distance D2 from a surface of the insulating layer 011 away from the substrate 110 to the substrate 110. The conductive metal layer 1061 is disposed in a same layer as the source 14 and the drain 15 of the thin film transistor TFT, for example, the conductive metal layer 1061 and the source 14 and the drain 15 of the thin film transistor TFT are manufactured using the same conductive material in a second patterning process. A surface of the electrode layer 1062 away from the substrate 110 is parallel to a plane PL where the substrate 110 is located, that is, the surface of the electrode layer 1062 away from the substrate 110 is flat, and there is no level difference between an edge of the surface of the electrode layer 1062 away from the substrate 110 and a center of the surface of the electrode layer 1062 away from the substrate 110. The electrode layer 1062 is disposed in a same layer as the pixel electrode 17, for example, the electrode layer 1062 and the pixel electrode 17 are manufactured using the same conductive material in a third patterning process.

In the embodiments of the present disclosure, of the top face (i.e., the surface of the electrode layer 1062 away from the substrate 110) of the conductive bump 106, there is no level difference between the edge and the center. After the motherboard of the opposite substrate 102 is assembled with the motherboard of the array substrate 101 to form the cell, if the supporting spacer 109 disposed on the opposite substrate 102 is in contact with the conductive bump 106, they are in planar contact in a planar manner. In this way, in the process of cutting or thinning and polishing the liquid crystal display panel motherboard, even if the supporting spacer 109 is squeezed by the external force, it may also ensure that a force borne by the top face of the conductive bump 106 is uniform, so that the conductive metal layer 1061 of the conductive bump 106 may be prevented from being crushed. Furthermore, it is possible to prevent adjacent conductive bumps 106 from being short-circuited due to the extrusion, and to prevent poor conduction in the finished liquid crystal display panel.

In addition, in the embodiments of the present disclosure, the conductive bump 106 includes the conductive metal layer 1061, which may ensure that the conductive bump 106 has good electrical properties. The electrode layer 1062 is located on the surface of the conductive metal layer 1601 and may protect the conductive metal layer 1601 from being etched. With reference to the substrate 110, the electrode layer 1062 of the conductive bump 106 is higher than the insulating layer 011, that is, the conductive bump 106 is in a convex shape, which is convenient to perform the bonding operation between the flexible circuit board 107 or other driving chips and the conductive bump 106. The pins of the flexible circuit board 107 or other driving chips are usually electrically connected to the conductive metal layer 1601 passing through the electrode layer 1602.

FIGS. 9 and 11 only illustrate structures of the conductive bump 106. In FIGS. 9 and 11, other film layers, such as the buffer layer 111 and/or the gate insulating layer 112, may be disposed between the signal line 108 and the substrate 110.

In some embodiments, the conductive bump 106 is connected to at least one signal line 108, and they can be in contact to connect each other. Referring to FIGS. 9 and 11, an orthogonal projection, on the substrate 110, of the conductive metal layer 1061 of the conductive bump 106 is located within an orthogonal projection, on the substrate 110, of the signal line(s) 108 connected to the conductive bump 106. That is, after the signal lines 108 and the insulating layer 011 are manufactured, a via hole is provided in a portion of the insulating layer 011 directly opposite to the signal line(s) 108, and then the conductive metal material may be deposited in the via hole to form the conductive metal layer 1061, so that the conductive metal layer 1061 covers a portion of the surfaces of the signal line(s) 108 to realize a contact connection between the conductive metal layer 1061 and the signal line(s) 108. Thus, a wiring structure and manufacturing process of the array substrate 101 are simplified, and an electrical connection property between the conductive bump 106 and the signal line(s) 108 is ensured.

In addition, in some of the above embodiments, the signal lines 108 are disposed in the same layer as the first gate 12 and the second gate 13, the conductive metal layer 1061 is disposed in the same layer as the source 14 and the drain 15, and the electrode layer 1062 is disposed in the same layer as the pixel electrode 17, which may also simplify the manufacturing process of the array substrate. It will be understood that the embodiments of the present disclosure are not limited to this structure, the conductive metal layer 1061 and the electrode layer 1062 of the conductive bump 106 and the signal lines 108 may be respectively disposed in a same layer as other electrodes or conductive layers located in different layers in the array substrate 101. For example, the electrode layer 1062 and the common electrode 16 are disposed in a same layer. The first gate 12, the second gate 13, the source 14, and the drain 15 are generally made of conductive metal materials and have good electrical conductivities. The metal material is, for example, aluminum, copper or silver. The pixel electrode 17 and the common electrode 16 are generally made of a transparent conductive material, such as indium tin oxide (ITO) or indium gallium zinc oxide (IGZO).

The expression "being disposed in a same layer" may refer to using a same material and forming in a single patterning process, or using different materials but both being located between the same two film layers, or using of different materials and being in direct contact with the same film layer. Here, the patterning process includes a photolithography process, or a process including a photolithography process and an etching process. The photolithography process refers to a process that includes film formation (e.g., chemical vapor deposition (CVD) film formation), exposure, development, and the like, and uses a photoresist, a mask, an exposure machine, and the like to form a pattern. The above-mentioned "first patterning process", "second patterning process" and "third patterning process" have the same or similar patterning process principles, and mask patterns of masks used respectively in the three processes are different.

The plurality of conductive bumps 160 are configured to be bonded to the flexible circuit board 107 or other driving chips. A distribution, shapes and sizes of the plurality of conductive bumps 160 are set to match corresponding bonding pins.

In some examples, as shown in FIG. 7, the plurality of conductive bumps 106 are arranged side by side in a first direction (X direction), and an extending direction (Y direction) of each conductive bump 106 intersects an extending direction of a boundary L0 of a side of the substrate 110 where the conductive bumps are arranged. The first direction is parallel to the extending direction of the boundary L0. A first space W1 between every two conductive bumps 106 is the same or substantially the same as a space between two pins to be bonded. In this way, it is convenient to perform the bonding operation between the flexible circuit board 107 or other driving chips and the conductive bumps 106, for example, each pin of the flexible circuit board 107 and a corresponding conductive bump 160 are directly joined by a thermocompression bonding process.

Figure 8:
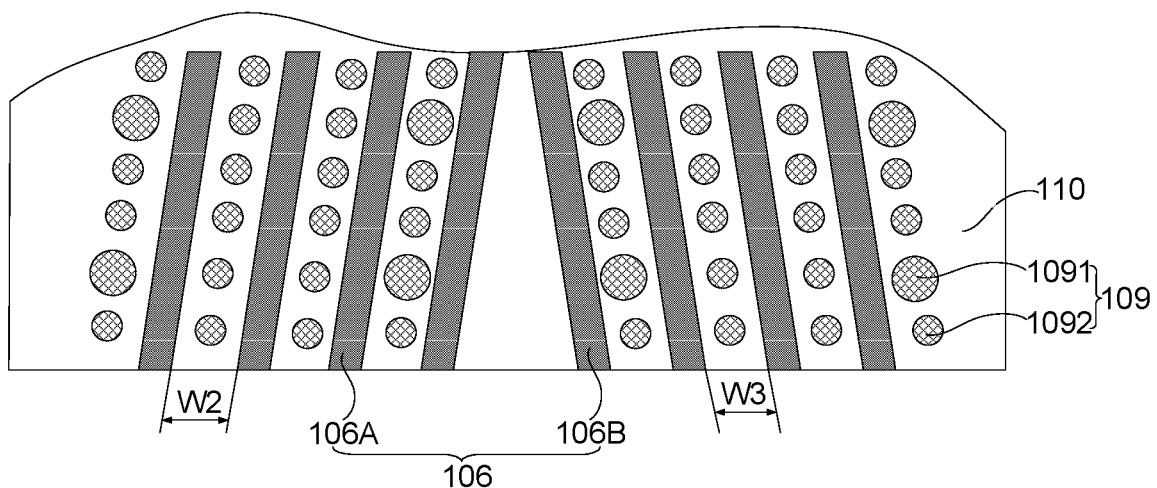
FIG. 8 is another schematic diagram showing distributions of conductive bumps and supporting spacers, in accordance with embodiments of the present disclosure.

In some other examples, as shown in FIG. 8, the plurality of conductive bumps 106 include first conductive bumps 106A and second type conductive bumps 106B that extend in different directions. An extending direction of the first conductive bump 106A intersects an extending direction of the second conductive bump 106B. A second space W2 between every two first conductive bumps 106A is the same or substantially the same as a space between two first pins to be bonded; and a third space W3 between every two second conductive bumps 106B is the same or substantially the same as a space between two second pins to be bonded. In this way, it is convenient to perform the bonding operation between at least one of the flexible circuit board 107 or other driving chips and the conductive bumps 106.

A shape of an orthogonal projection of the conductive bump 106 on the substrate 110 may be various, such as a square or a rectangle. For example, the conductive bumps 106 are strip-shaped, and the shape of the orthogonal projection of the conductive bump 106 on the substrate 110 is a rectangle with a length much greater than a width.

In some of the above embodiments, the space between every two adjacent conductive bumps 106 is equal or substantially equal, that is, the plurality of conductive bumps 106 are arranged at equal intervals, which is beneficial to simplify a wiring design of the signal lines in the array substrate 101, and may also prevent the electrical properties of the conductive bumps 106 from being affected due to a relatively small space between some two adjacent conductive bumps 160.

After the liquid crystal display panel motherboard 100 is cut to obtain a plurality of liquid crystal display panels, as shown in FIG. 5, the liquid crystal display panel motherboard 100 includes an array substrate 101, an opposite substrate 102, a liquid crystal layer 103, and spacers. Structures of the array substrate 101 and the opposite substrate 102 are as described in some of the above embodiments. The liquid crystal layer 103 is disposed between the array substrate 101 and the opposite substrate 102. The spacers here include a plurality of supporting spacers 109 that are located in the bonding region CC and to be removed, and the aforementioned plurality of spacers 215 located in the display area AA.

Referring to FIGS. 7 and 8, in the embodiments of the present disclosure, an orthogonal projection of a supporting spacer 109 on the substrate 110 is located outside an orthogonal projection of the conductive bump 106 on the substrate 110. Thus, it is possible to ensure that the supporting spacer 109 is not in contact with the conductive bump 106. In this way, in the process of cutting or thinning and polishing the liquid crystal display panel motherboard, due to extrusion of an external force, the supporting spacer 109 exerts a force on the insulating layer 011, so that the conductive bump 106 may not be subjected to pressure, and it is possible to prevent the conductive bump 106 from being crushed, and further prevent the problem of short circuit between adjacent conductive bumps 106 due to the extrusion. As a result, it is beneficial to improve a yield of the finished liquid crystal display panel.

Referring to FIGS. 7 and 8, in some embodiments, there is a space (e.g., the first space W1, the second space W2, or the third space W3) between every two adjacent conductive bumps 106. Orthogonal projections of the plurality of supporting spacers 109 on the substrate 110 are uniformly distributed within orthogonal projections of a plurality of spaces on the substrate 110. That is, the plurality of supporting spacers 109 are uniformly distributed in the spaces, and the supporting spacers 109 may be used to stably support the array substrate 101 and the opposite substrate 102, thereby ensuring that forces borne by the supporting spacers 109 are uniform during the process of cutting or thinning and polishing the liquid crystal display panel motherboard 100.

Referring to FIG. 8, in some embodiments, the plurality of supporting spacers 109 include a plurality of primary supporting spacers 1091 and a plurality of auxiliary supporting spacers 1092. The primary supporting spacers 1091 and the auxiliary supporting spacers 1092 are uniformly distributed in the bonding region CC.

In the embodiments of the present disclosure, the plurality of supporting spacers 109 are classified into primary and auxiliary supporting spacers, and these two types of supporting spacers are uniformly distributed in the bonding region CC, so that it is possible to use the primary supporting spacers 1091 and the auxiliary supporting spacers 1092 to cope with different extrusion forces, so as to effectively support the array substrate 101 and the opposite substrate 102 under different force conditions. As a result, it is further ensured that the force borne by each supporting spacer 109 is uniform during the process of cutting or thinning and polishing the liquid crystal display panel 100.

In some embodiments, the opposite substrate 102 is a color filter substrate, and each supporting spacer 109 is formed on a surface of the color filter substrate 102 proximate to the array substrate 101. Referring to FIGS. 4 and 5, the supporting spacers 109 are disposed in a same layer as the spacer 215 of the opposite substrate 102 located in the display area AA, for example, the supporting spacers 109 and the spacers 215 are manufactured using the same material in a patterning process. Each supporting spacer 109 and each spacer 215 that is located in the display area AA adopt a columnar spacer.

It is to be supplemented that in the liquid crystal display panel shown in FIG. 5, the supporting spacers 109 need to be removed, so that the conductive bumps 106 on the array substrate 101 are exposed. Thus, portions of the opposite substrate 102 on which the supporting spacers 109 are disposed are also removed at the same time.

Referring to FIG. 1, in the display apparatus 1000 provided by some embodiments of the present disclosure, the liquid crystal display panel 100 is located on a light exit side of the backlight module 200. The liquid crystal display panel 100 is obtained by cutting a liquid crystal display mother substrate 100 and removing the supporting spacers 109. The display apparatus 1000 further includes the flexible circuit board 107 bonded to the plurality of conductive bumps 106 in the array substrate 101.

In the description of the above embodiments, specific features, structures, materials or characteristics may be combined in any suitable manner in any one or more embodiments or examples.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An array substrate, having a display area and a bezel area located on at least one side of the display area, the bezel area including a bonding region, the array substrate comprising:
    a substrate;
    a plurality of signal lines disposed on the substrate;
    a plurality of conductive bumps disposed on a portion of the substrate located in the bonding region, a conductive bump being connected to at least one signal line; and
    an insulating layer covering the plurality of signal lines and located between every two adjacent conductive bumps; wherein
    the conductive bump includes a conductive metal layer, the conductive bump includes a conductive metal layer, a distance from a surface of the conductive metal layer away from the substrate to the substrate is substantially equal to a distance from a surface of the insulating layer away from the substrate to the substrate; the conductive bump further includes an electrode layer disposed on the surface of the conductive metal layer away from the substrate; and a surface of the electrode layer away from the substrate is parallel to a plane where the substrate is located;
    the array substrate further comprising a plurality of thin film transistors disposed on the substrate, a thin film transistor including a gate, a source, and a drain; wherein
    the gate and the signal lines are disposed in a same layer, the insulating layer is located on a side of the gate away from the substrate, and the source and the drain are located on a side of the insulating layer away from the substrate;
    the conductive metal layer is disposed in a same layer as the source and the drain; and
    an orthogonal projection of the conductive metal layer on the substrate is located within an orthogonal projection of a signal line connected to the conductive metal layer on the substrate.

2. The array substrate according to claim 1, wherein the plurality of conductive bumps are arranged side by side in a first direction, and an extending direction of the conductive bump intersects an extending direction of a boundary of a side of the substrate where the conductive bumps are arranged; and
    the first direction is parallel to the extending direction of the boundary.

3. The array substrate according to claim 2, wherein the plurality of conductive bumps include first conductive bumps and second conductive bumps that extend in different directions.

4. The array substrate according to claim 1, wherein the conductive bumps are strip-shaped.

5. The array substrate according to claim 4, wherein a space between every two adjacent conductive bumps is substantially equal.

6. The array substrate according to claim 1, further comprising a plurality of pixel electrodes disposed on a side of the drain away from the substrate, a pixel electrode being connected to the drain of the thin film transistors; wherein the conductive bump further includes an electrode layer, the electrode layer is disposed in a same layer as the pixel electrodes.

7. A liquid crystal display panel motherboard, comprising:
    the array substrate according to claim 1;
    an opposite substrate; and
    a liquid crystal layer disposed between the array substrate and the opposite substrate; wherein
    a portion of the opposite substrate opposite to the bonding region is provided with a plurality of supporting spacers therein, an orthogonal projection of a supporting spacer on the substrate is located outside an orthogonal projection of the conductive bump on the substrate.

8. The liquid crystal display panel motherboard according to claim 7, wherein every two adjacent conductive bumps have a space therebetween, orthogonal projections of the plurality of supporting spacers on the substrate are uniformly distributed within orthogonal projections of a plurality of spaces on the substrate.

9. The liquid crystal display panel motherboard according to claim 7, wherein the plurality of supporting spacers include a plurality of primary supporting spacers and a plurality of auxiliary supporting spacers; and
    the plurality of primary supporting spacers and the plurality of auxiliary supporting spacers are uniformly distributed in the bonding region.

10. The liquid crystal display panel motherboard according to claim 7, wherein the opposite substrate includes a color filter substrate, the plurality of supporting spacers are disposed on a surface of the color filter substrate proximate to the array substrate.

11. A display apparatus, comprising:
    a liquid crystal display panel;
    a flexible circuit board bonded to the plurality of conductive bumps in the array substrate according to claim 1; and a backlight module; wherein
    the liquid crystal display panel is located on a light exit side of the backlight module.

12. A liquid crystal display panel motherboard, comprising:
    the array substrate according to claim 1; and
    an opposite substrate; wherein
    a portion of the opposite substrate opposite to the bonding region is provided with a plurality of supporting spacers, a supporting spacer is in contact with the conductive bump.

13. A method for manufacturing a liquid crystal display panel, comprising:
    providing the array substrate according to claim 1;
    providing an opposite substrate, including:
        providing a plurality of supporting spacers in a portion of the opposite substrate opposite to the bonding region;
    assembling the array substrate with the opposite substrate to form a cell, so as to obtain a liquid crystal display panel motherboard;
    cutting the liquid crystal display panel motherboard; and
    removing the plurality of supporting spacers to obtain the liquid crystal display panel.

14. A method for manufacturing the liquid crystal display panel according to claim 13, wherein an orthogonal projection of a supporting spacer on the substrate is located outside an orthogonal projection of the conductive bump on the substrate.

15. A method for manufacturing the liquid crystal display panel according to claim 13, wherein a supporting spacer is in contact with the conductive bump.

* * * * *